Oct. 18, 1949.     S. B. FARNHAM ET AL     2,485,374
TURBINE-GENERATOR LOAD CONTROL SYSTEM
Filed Sept. 27, 1947
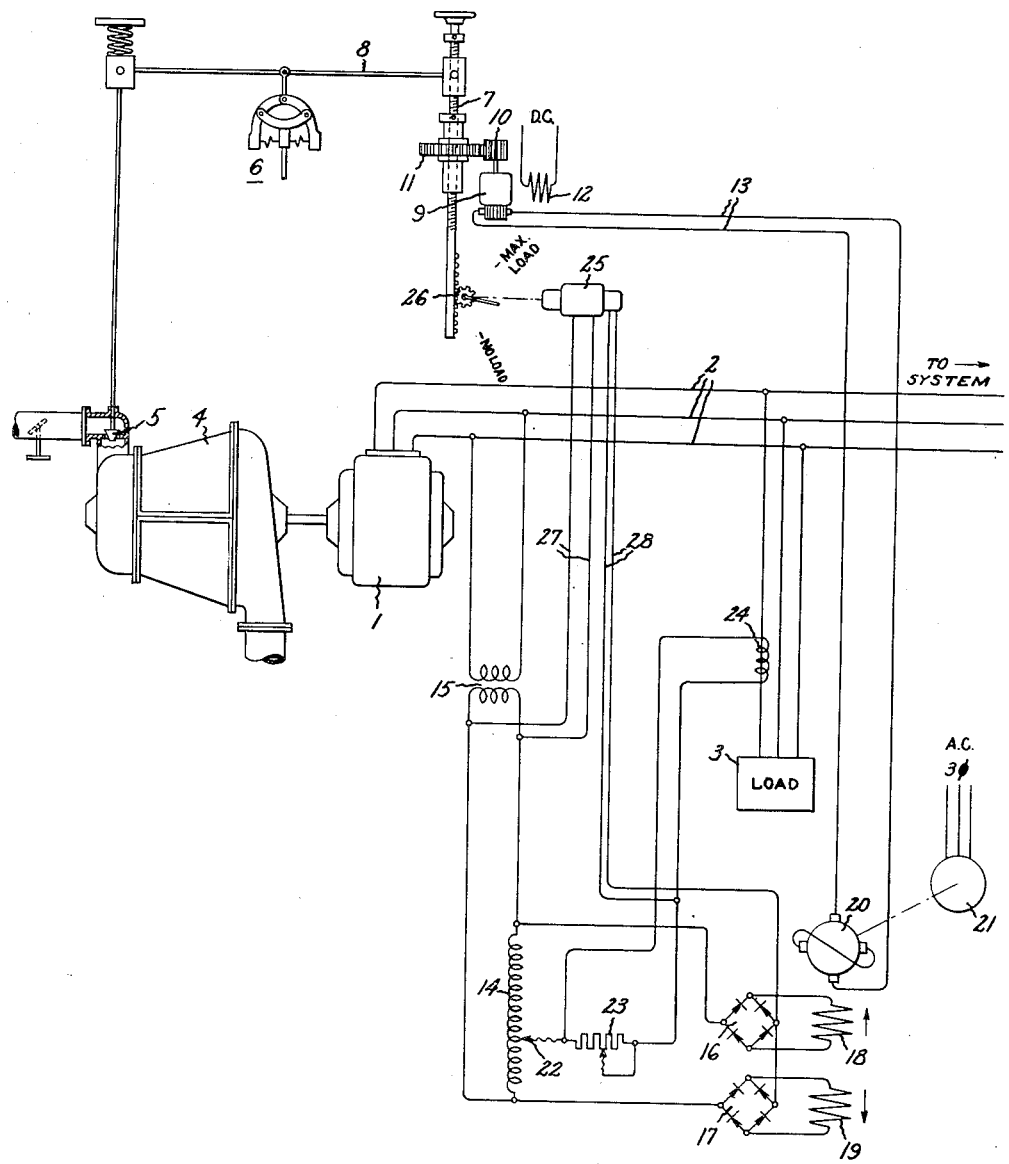
Inventors:
Sherman B. Farnham,
Raymond Sneppard,
by Prowell & Mack
Their Attorney.

Patented Oct. 18, 1949

2,485,374

UNITED STATES PATENT OFFICE 2,485,374

TURBINE-GENERATOR LOAD CONTROL SYSTEM

Sherman B. Farnham and Raymond Sheppard, Schenectady, N. Y., assignors to General Electric Company, a corporation of New York Application September 27, 1947, Serial No. 776,550

9 Claims. (Cl. 290—40)

Our invention relates to a control system for prime mover driven electric generators, and more particularly to a system for regulating the power output of a turbine driven generator which forms a part of an interconnected alternating current system.

It is often desirable where a plurality of alternating current generators are interconnected to form a power transmission and distribution system, to provide control means that will prevent load swings or power changes arising in one particular unit of connected load from being transmitted over the power system as a whole. This is particularly objectionable in the case where one or more particular units of the connected load may be of the heavy industrial type, such as a rolling mill or the like, wherein the power demands are relatively heavy and usually of short duration. In such cases, it is advisable to prevent these heavy short-time power swings from being transmitted throughout the interconnected systems, and to provide control equipment that will operate to force one particular generator to carry the excess power demand. This may be accomplished by means of a power responsive system which functions upon an increased power demand from the mill or load, rapidly to reset the speed governor calibration of the particular turbine-generator set so that that set alone will carry the increased load demand of the mill. Thus, upon the initiation of governor adjustment action by the mill power responsive circuit, fuel or steam flow to the prime mover is increased which results in a tendency for this particular prime mover to increase its power output and thereby deliver the additional load which is required by the mill, thereby preventing the increased power demand from being transmitted throughout the system with consequent voltage fluctuations and, in extreme cases, possible loss of synchronism between other interconnected machines on the system.

In a sense, the system acts as a frequency change anticipating device since the turbine governor adjustment is made rapidly in response to the demand for increased power by the mill. Thus, it is not a question of waiting until the increased load has resulted in a corresponding speed and frequency reduction in the connected turbine-generator sets which would normally initiate corrective action by each set's speed responsive governor. Since the system operates by re-positioning of the governor calibration and does not disable the governor, the normal regulating action of the governor is not interfered with in any way, and it is still free to maintain control of the turbine-generator sets in the event that system load changes, other than that referred to in connection with the one particular mill load, occur.

It is an object of our invention to provide improved load controlling apparatus for a prime mover driven electric generator.

It is another object of our invention to provide improved load balance regulating apparatus for a turbine driven generator interconnected with an alternating current power system.

It is a further object of our invention to provide an improved control system for a turbine generator and interconnected power system for maintaining system stability throughout variations in the power demands of a connected load.

It is still another object of our invention to provide an improved speed and load control system for a turbine-generator which regulates the power output of the generator while not disabling the normal speed governor control of the turbine-generator set.

Our invention will be better understood from the following description taken in connection with the accompanying drawing, in which the single figure is a diagrammatic illustration of one embodiment of our invention, and its scope will be pointed out in the appended claims.

Referring to the drawing, a synchronous alternating current generator 1 is connected to a polyphase system 2 which may, or may not, be interconnected with other generators to form a complete electrical power distribution system. Connected to the system 2 is an external load 3, such as a rolling mill, and adjusting the power drawn from the generator 1 by the load 3 is the function of our invention. The generator 1 is mechanically arranged to be driven by the prime mover 4 which is shown as an elastic fluid turbine having a throttle valve 5 which is under the control of a speed governor 6. The governor may be of the conventional flyball type as shown, and is driven by the turbine shaft through suitable mechanical connections and operates to maintain turbine speed substantially constant at any predetermined desired setting by adjustment of the throttle valve 5. A governor adjusting mechanism is provided for resetting the governor position in response to the power demands of the connected load 3, and consists of the screw 7 which is effective, by rotation in one direction or the other, to raise or lower the governor setting by means of the floating linkage 8. The screw 7 is rotated by means of the reversible direct current motor 9, the armature of which carries a pinion 10 that meshes with the driving gear 11 which is secured to the adjusting screw. The governor adjusting mechanism, as illustrated and described, is similar to that shown in the Patent No. 2,243,561, granted May 27, 1941 to W. M. Hanna and assigned to the same assignee as the present invention. A constant potential direct current field 12 is provided for the motor 9, and reversal of the motor rotation is accomplished by reversal of direction of current flow to the armature through the armature conductors 13.

From the foregoing it will be seen that rotation of the screw 7 in a direction to raise the right end of the lever 8 will move the lever 8 counterclockwise about its central point as a pivot, thereby moving the throttle valve 5 towards a closed position and reducing the output of the turbine 4. Conversely, lowering of the right end of the lever 8 will result in an increase in fluid flow to the turbine, thereby enabling it to assume an increased load on synchronous generator 1. Since the lever 8 is of the floating type and free to move in a vertical plane throughout its entire length, the normal control action of the flyball governor is not restricted by movement of the adjusting mechanism 7. The lever is thus free to pivot either about its central point when being actuated by the adjusting mechanism 7, or free to pivot about its right end when being controlled by the action of the flyball governor 6. These two adjustments may take place separately or simultaneously with the result that speed control of the turbine is always retained by the flyball governor 6.

In order to effect operation of the governor adjusting motor 9, a control system that is sensitive to the amount of power being drawn by the load 3 and also responsive to the position of the governor setting is provided. This consists of a bridge or network comprising the adjustable voltage tapped transformer 14 which is supplied with constant potential alternating current from the main system 2 by means of the potential transformer 15. The A. C. input terminals of a pair of unidirectional current conducting devices 16 and 17 are connected in series with each other and with each end of the transformer 14, and the direct current output terminals of each of the rectifier bridges are connected to a pair of control field windings 18 and 19, respectively, of opposed polarity as shown by the directional arrows alongside these windings on the drawing. Reversible direct current for operating the governor control motor 9 is supplied by the dynamo-electric machine 20, and for this application we prefer to use the amplidyne-type of dynamo-electric machine due to its extreme sensitivity and fast rate of response. The amplidyne 20 may be driven by any suitable source of power such as the three phase induction motor 21. The output current of the amplidyne is, therefore, directly responsive, both in value and in direction, to the net flux created by its opposed field windings 18 and 19. For example, a predominance of current in field winding 18 over that in field winding 19 will cause the output current of the amplidyne to be in a direction for operating the governor control motor 9 in one direction, whereas the reverse is true in the event the direct current in the winding 19 exceeds that in field winding 18. When the current in the field windings 18 and 19 is equal, the net flux is of course zero and no output current flows from the amplidyne to the governor adjusting motor 9. In order to adjust the system so that the generator 1 will carry a predetermined value of base load, the transformer 14 is provided with an adjustable voltage tap 22 which, as shown, is placed below the midpoint of the transformer 14. In series with the tapped connection 22 and the common junction of the rectifiers 16 and 17, we have provided a circuit that includes elements responsive to the current being drawn by the load 3 and also the relative position of the governor adjusting screw 7. The power responsive element consists of the variable resistor 23 which is placed in parallel with the current transformer 24, and the voltage appearing across the resistor 23 is, therefore, directly proportional to the current flowing in the current transformer and hence proportional to the current being taken by the external load 3. In series with resistor 23, a signal is introduced which varies in magnitude with the position of the adjusting screw 7 on the governor control mechanism. This signal is provided by means of a Selsyn 25 which is mechanically rotated by means of the rack and pinion 26 on the lower end of the adjusting screw, and the Selsyn is supplied with a stator energizing potential by the conductors 27 as shown. The voltage output of the rotor of the Selsyn 25 is variable from a minimum to a maximum value, depending on the angular position of the rotor which, in turn, is adjusted for each movement of the governor adjusting screw 7. The voltage output or signal from the rotor of the Selsyn is thus inserted by means of conductors 28 in series with and in opposition to the voltage produced across the resistor 23.

In the event that a Selsyn is used as illustrated, it will be desirable to select the proper operating relationship of rotor to stator so that the voltage produced in the rotor will vary approximately linearly throughout its entire range of operation corresponding to the no load-to-maximum load position of the governor adjusting mechanism. Obviously, our device is not limited only to the use of a Selsyn to produce a signal which is proportional to travel or position of the governor adjusting mechanism, for a potentiometer or rheostat, or a rotary-type of variable voltage transformer could be used to perform this function.

The operation of the system will be understood best by assuming that the bridge circuit is in the balanced condition and that the transformer tap 22 has been moved to the desired position, as illustrated, thereby allowing the generator 1 to carry some definite value of continuous base load. Under these conditions, the voltage across the lower part of the transformer winding 14 plus the sum of the voltage across the resistor 23 and Selsyn output voltage is equal to the voltage across the upper part of the transformer winding 14 minus the sum of the voltages across the resistor 23 and Selsyn 25, and the bridge is balanced with equal and opposite currents flowing in the rectifier bridges 16 and 17 with corresponding equal currents flowing in the opposed amplidyne field windings 18 and 19.

If a large amount of power is suddenly drawn by the load 3, it is highly desirable that the generator 1 assume this load, within its maximum power rating of course, rather than have such load swings transmitted to the external system with consequent voltage variations and possible loss of synchronism between interconnecting machines. The occurrence of power flow in the load 3 causes a potential to be developed across the resistor 23 which unbalances the bridge in a direction to increase the current flow in the field winding 18 of the amplidyne. This causes current to flow in the armature circuit of the governor reset motor 9 in a proper direction to operate the adjusting screw so that the right end of the lever 8 will be lowered, thereby increasing steam flow to the turbine and forcing the generator 1 to take up the increased load called for by the current transformer 24. At the same time that the adjusting screw 7 is operated, it will be noted that the Selsyn 25 is also being rotated a corresponding amount so that the signal produced by the Selsyn rotor is being increased in magnitude, and such adjusting action will continue until the sum of the voltages produced across the resistor 23 and by the Selsyn rotor, when added to the voltage across the lower part of the transformer winding 14, and when subtracted from the voltage across the upper part of the transformer winding, again equal each other and the bridge is again balanced with a resultant cessation of operation of the governor adjusting motor 9. As long as the increased power demanded by the load 3 remains in effect, the bridge will remain balanced and the turbine generator set will operate under the higher load conditions while still supplying the original value of base load to the interconnected system. When the demand for power from the load 3 ceases, the reverse of the foregoing operation will take place; that is, the voltage across the resistor 23 will disappear and the voltage of the Selsyn rotor will then predominate but in the opposite direction, thereby unbalancing the bridge in the reverse direction and causing an excess of current to flow in the field winding 19 over that flowing in the field winding 18. The direct current output of the amplidyne 20 is then in the opposite direction and will operate the governor adjusting motor 9 in the reverse direction to raise the right end of the lever 8, thereby returning the throttle valve to its original position and restoring the load condition on the synchronous generator 1 to its original state.

Since the system as illustrated has an extremely high speed of response due to the inherent characteristics of the bridge and amplidyne control, it is found that proper adjustment is made in the throttle valve 5, prior to the time that the increase in load would be effective to cause normal speed regulating action of the governor 6 through its centrifugal mechanism. This fast acting forcing feature also prevents load swings from being transmitted to other generators interconnected with the system since these generators would first have to assume some of the increased load before their governors would respond to restore speed and frequency by opening their throttle valves. In a sense, the control system operates as a frequency change anticipator since the adjusting action to reset the governor commences as soon as any increase in power begins to flow to the external load 3 without waiting for the increase in load on the main generator 1 to slow down the turbine and to initiate action of its mechanical speed governor. An important advantage is found in the ability of the system to control the turbine generator output during power swings, while at the same time leaving the turbine generator under the control of its own speed governor 6 in the event that any substantial change in load demanded by the external system arises. For example, an increase in the amount of load on the system causes the system speed to decrease and thereby increases the amount of base load supplied by the generator 1, and the speed governor 6 will operate normally to open the throttle valve 5 and increase power output of the prime mover 4 so as to restore turbine speed to the predetermined value without disturbing any setting made by the governor adjusting mechanism 7 in response to power swings in the load 3. Thus, the normal regulating ability of the turbine governor 6 is not disturbed by any changes of the governor adjusting mechanism.

While we have shown and described a particular embodiment of our invention, it will be obvious to those skilled in the art that changes and modifications may be made without departing from our invention in its broader aspects, and we, therefore, aim in the appended claims to cover all such changes and modifications as fall within the true spirit and scope of our invention.

What we claim as new and desire to secure by Letters Patent of the United States is:

1. A regulating system for a prime-mover driven electric generator connected to supply power to a variable load comprising, a speed governor for said prime mover, control means for adjusting the calibration of said speed governor, means responsive to current variations in said load for supplying a corrective signal to said governor adjusting control means, the speed of said prime mover being controlled simultaneously by said governor and by said control means, and position-operated means responsive to the adjusted position of said governor for supplying a signal to said control means in opposition to said corrective signal.

2. A regulating system for a prime-mover driven electric generator connected to supply power to a variable load comprising, a speed governor for said prime mover, electrically-operated control means for raising or lowering the calibration of said speed governor, means responsive to power flow in said load in excess of a predetermined value of base power for supplying a corrective signal to said governor adjusting control means, and position-operated means responsive to the adjusted position of said governor for supplying a signal to said control means in opposition to said corrective signal.

3. A regulating system for a prime-mover driven electric generator connected to supply power to a variable load comprising, a speed governor for said prime mover, electric control means including a reversible motor operated device for adjusting the calibration of said speed governor, means responsive to a variation in load current from a predetermined value of base load current for supplying a corrective signal to said governor adjusting means, means for generating an electric position signal dependent on said adjusted governor position, and circuit means for supplying said electric position signal to said control means in opposition to said corrective signal.

4. A regulating system for a prime-mover driven electric generator arranged to supply power to an alternating current power system and to a variable load connected thereto comprising, a speed regulating governor for said prime mover, control means for varying the calibration of said speed governor, means associated with said control means for predetermining the proportion of said variable load to which said governor is responsive, means responsive to variations in current flow to said load for supplying a corrective signal to said governor adjusting control means, the speed of said prime mover being controlled simultaneously by said governor and by said control means, and position-operated means responsive to the adjusted position of said governor for supplying a signal to said control means in opposition to said corrective signal.

5. A regulating system for a prime-mover driven electric generator arranged to supply power to an alternating current power system and to a variable load connected thereto comprising, a speed regulating governor for said prime mover, a reversible motor operated mechanism for adjusting the calibration of said speed governor, control means for reversibly energizing said motor, means responsive to variations in power flow in said load from a base value for supplying a corrective signal to said control means, and position-operated electrical signal generating means responsive to the adjusted position of said governor for supplying a signal to said control means in opposition to said corrective signal.

6. A regulating system for a prime-mover driven electric generator arranged to supply power to an alternating current power system and to a variable load connected thereto comprising, a speed regulating governor for said prime mover, control means for adjusting the calibration of said speed governor, means responsive to variations in current flow in said load for supplying a corrective signal to said governor adjusting control means, the speed of said prime mover being controlled simultaneously by said governor and by said control means, position-operated means responsive to the adjusted position of said governor for supplying a signal to said control means in opposition to said corrective signal, and means associated with said load current responsive means for presetting said governor for a desired amount of continuous base power to be supplied to said power system by said generator.

7. A regulating system for a turbine-driven electric generator connected to supply power to a variable load comprising, a speed governor for said turbine, means for adjusting the calibration of said speed governor including a pair of oppositely acting control elements, an electric bridge circuit having said pair of opposed control elements therein arranged so that said elements are energized selectively depending on the direction of unbalance of said bridge, means responsive to current flow in said load for unbalancing said bridge to energize one of said control elements, and position-operated means responsive to the adjusted position of said governor for supplying a signal to said bridge to counteract said unbalance.

8. A regulating system for a turbine-driven electric generator connected to supply power to a variable load comprising, a speed governor for said turbine, means for adjusting the calibration of said speed governor including a pair of oppositely acting control elements, an electric bridge circuit having said pair of opposed control elements therein arranged so that said elements are energized selectively depending on the direction of unbalance of said bridge, means responsive to current flow in said load for unbalancing said bridge to energize one of said control elements, and position-operated rotary induction apparatus associated with said governor adjusting means for supplying a signal the magnitude of which is directly related to the position of said governor adjusting means to said bridge for counteracting said unbalance.

9. A regulating system for a turbine-driven electric generator connected to supply power to a variable load comprising, a speed governor for said turbine, means for adjusting the calibration of said speed governor including a reversible dynamoelectric machine having a pair of oppositely acting control field windings, an electric bridge circuit having said pair of control field windings therein arranged so that said windings are energized selectively depending on the direction of unbalance of said bridge, means responsive to variations in current flow in said load for unbalancing said bridge to energize one of said control field windings, and position-operated means responsive to the adjusted position of said governor for supplying a signal to said bridge to counteract said unbalance by energizing the other of said control field windings.

SHERMAN B. FARNHAM.
RAYMOND SHEPPARD.

REFERENCES CITED

The following references are of record in the file of this patent:

UNITED STATES PATENTS

| Number | Name | Date |
| --- | --- | --- |
| 1,110,799 | Kramer | Sept. 15, 1914 |
| 1,159,174 | Callan | Nov. 2, 1915 |
| 1,685,740 | Earle | Sept. 25, 1928 |
| 1,740,078 | Earle | Dec. 17, 1929 |
| 1,761,797 | Pfau | June 3, 1930 |
| 1,792,241 | Ray | Feb. 10, 1931 |
| 1,907,517 | DeCamp | May 9, 1933 |
| 2,015,555 | Fountain | Sept. 24, 1935 |
| 2,016,890 | Chesnut | Oct. 8, 1935 |
| 2,020,080 | Rosch | Nov. 5, 1935 |
| 2,098,654 | Carter | Nov. 9, 1937 |
| 2,243,561 | Hanna | May 27, 1941 |